Feb. 12, 1946.  E. A. STROMMEN  2,394,569
FITTING HEARING AID DEVICES
Filed July 14, 1941  2 Sheets-Sheet 1
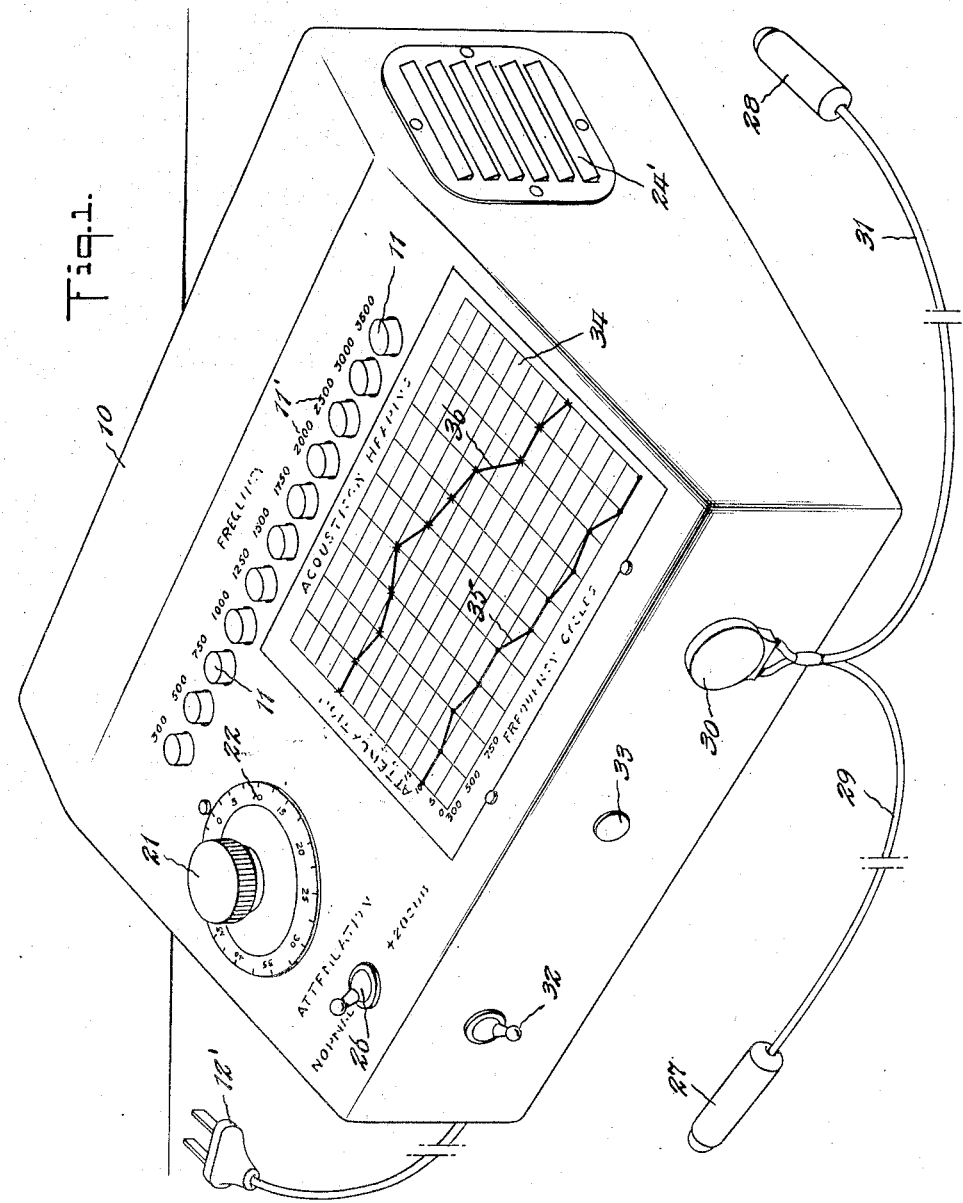

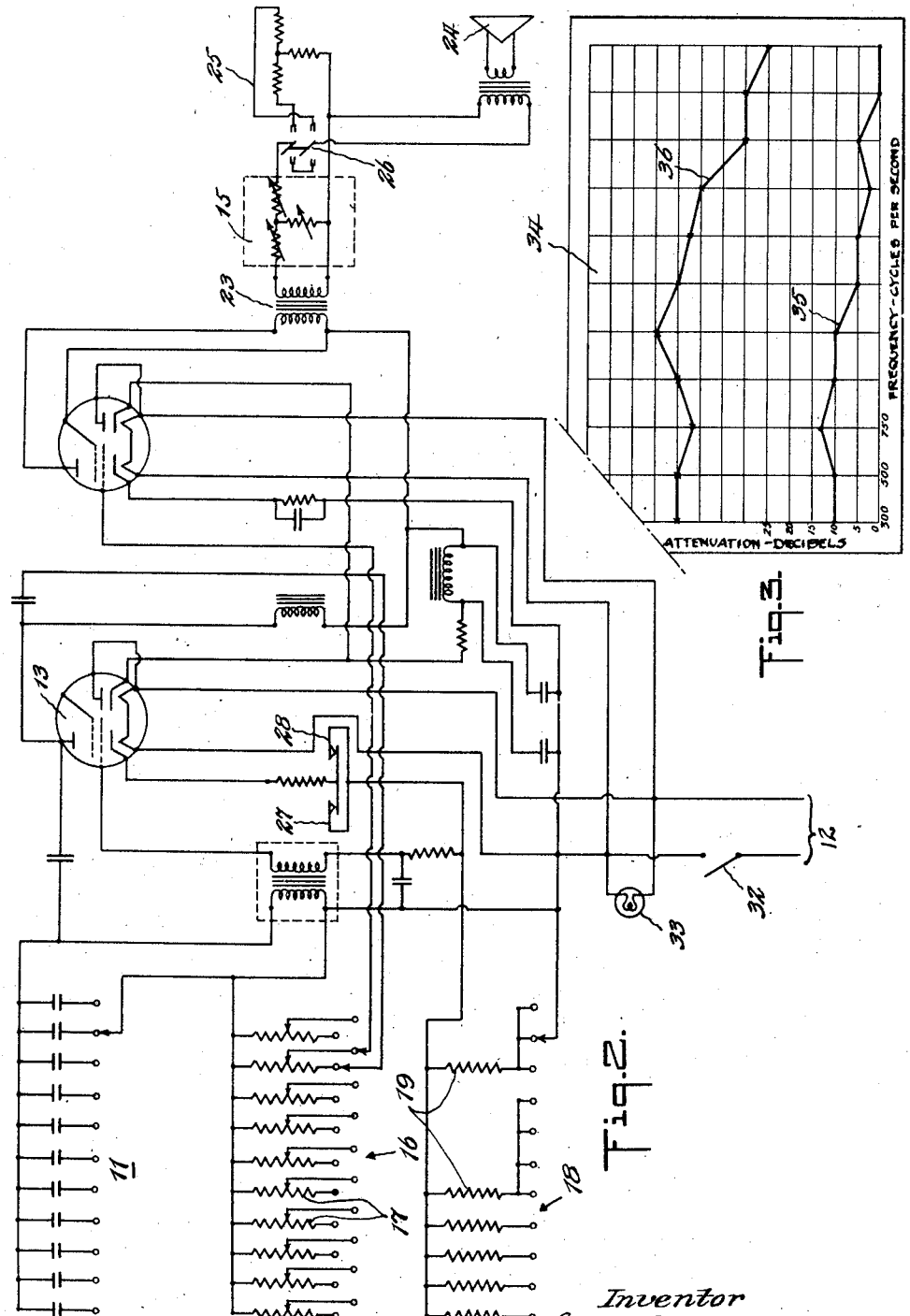

Patented Feb. 12, 1946

2,394,569

UNITED STATES PATENT OFFICE 2,394,569

FITTING HEARING AID DEVICE

Einar A. Strommen, Jamaica, N. Y., assignor to Dictograph Products Company, Inc., New York, N. Y., a corporation of Delaware Application July 14, 1941, Serial No. 402,385

2 Claims. (Cl. 181—0.5)

This invention relates to a method of fitting hearing aid devices, and has particular reference to a method of comparing the relative hearing acuity of a subject before and after fitting with a hearing aid device under the same external conditions.

According to the methods heretofore employed for fitting hearing aid devices, an audiometric measurement of the subject's hearing loss was made and then he was provided with an arbitrarily-selected hearing aid which theoretically raised his threshold of hearing to or near normal. However, the readings on which the fitting was based were taken under artificial conditions not comparable to normal, because ordinary background noises, on which all sounds selected by the ear are superimposed, were excluded and the subject could not hear normally when fitted with the hearing aid because the background noises then became apparent. Also, it has always been difficult to obtain satisfactory results because the subject is relied upon to compare for himself the volume and quality of sound that he hears, with his normal hearing, as he recalled it, perhaps many years before.

In accordance with the present invention, a hearing aid fitting method is provided in which the hearing acuity of the subject is determined for numerous sound frequencies and volumes without any effort being made to measure his hearing loss. The subject is placed in a position relative to the apparatus and remains there under the same background noise conditions throughout the test. The operator first records the subject's relative hearing acuity without a hearing aid on a convenient scale calibrated according to frequencies and volume. The apparatus for practicing the method of this invention comprises an oscillator with an attenuator or other means for producing sounds at various frequencies operated by the operator. A loud speaker reproduces the sound signal by the operator at each frequency, and the sound is attenuated by the operator until the subject no longer hears it, which he indicates by failure to duplicate the signal produced by the operator. After the operator has plotted the curve for each frequency at the lowest volume that the subject hears, he then provides the subject with a hearing aid and repeats the process, plotting a similar curve at the lowest sound volume or highest attenuation heard by the subject for each frequency. The second curve indicates the relative gain in hearing ability afforded by the hearing aid in comparison to the first curve, and consequently is a relative measure of the subject's hearing as changed by the hearing aid. It will be seen that the method of this invention enables the subject to select his own hearing aid in accordance with the best improvement provided thereby over his unaided hearing. The first curve plotted by the operator enables the operator in his judgment to select a hearing aid which will provide the improvement in hearing which is apparently necessary. The actual selection, however, is made by the user under the ordinary and natural conditions of background sounds that are always present in everyday life, and in order that the selection will be proper the volume of sounds during both tests is maintained. Thus the improvements of this invention provide for most accurate fitting of a hearing aid on the subject without any effort being made to quantitatively determine the subject's hearing loss, the two plotted curves being purely relative.

For a more complete understanding of the invention, reference may be had to the accompanying drawings, in which:

Figure 1 illustrates in perspective the apparatus whereby the method of this invention may be practiced;

Fig. 2 is a schematic electrical diagram of the apparatus; and

Fig. 3 illustrates a preferred form of card on which the relative hearing curves are plotted.

Referring to Fig. 1, numeral 10 designates a housing enclosing the operating elements of the apparatus shown in Fig. 2. At the top of the sloping panel of the apparatus is a series of push buttons 11, one for each of the frequencies desired, such as eleven, running from 300 to 3500 cycles per second at intervals of 200 to 250, for example, as indicated on the scale 11'. The push buttons 11 are so arranged with a latching mechanism similar to that shown in Andrick et al. Patent No. 1,081,712, that when one button 11 is pressed it is latched in circuit-making position, while at the same time any other button that may have been previously depressed is released and breaks its circuit, and thus only one selected frequency can be impressed on the apparatus at one time. The particular structure of this latching mechanism forms no part of the present invention and may be like that disclosed in said patent. Hence detailed description thereof is unnecessary.

As shown in Fig. 2, each button 11 of Fig. 1 inserts a condenser of different capacity into the oscillator circuit supplied with alternating or direct current from a convenient light socket source, the supply line being designated 12 in Fig. 2, and being indicated by the plug 12' in Fig. 1. The oscillator comprises the vacuum tube 13 with an amplifier tube 14. As the connections thereto and therefrom form no part of the present invention, they need not be further described as they are self-explanatory from Fig. 2.

Attenuation is provided by a rheostat shown schematically at 15 in Fig. 2 and adjustable at will by the operator by means of a knob 21 on the instrument panel. Thus, by rotating the knob 21, the attenuation is changed to any of the numbers of decibel calibrations shown on attenuator dial 22 and running from zero to 65, for example, in intervals of 2.5 decibels. The resistance bank 16 is used for initial calibration of the instrument, and comprises a series of potentiometers 17, one for each frequency button 11, which are adjusted so that the acoustic output follows standard loudness curves, and then the potentiometers 17 are locked in adjusted position. Resistance bank 18 comprises a series of fixed resistors 19 for stabilizing the oscillator at each frequency. As each button 11 is pressed, a corresponding resistance 19 is cut in automatically. The arrangement of the resistance banks 16 and 18 and the particular method of obtaining the attenuation are not per se parts of the present invention.

The output of the oscillator at any of the attenuated selected frequencies is coupled through transformer 23 to the circuit of a loud speaker 24, which accordingly reproduces the oscillator note at the selected frequency. A separate network 25 may be connected by a switch 26 into the loud speaker circuit or disconnected therefrom in order to add or subtract twenty decibels to the reading of the dial 22 of the attenuator, depending on the degree of deafness of the subject.

Interposed in the oscillator circuit are two paralel switches 27 and 28 which are normally open, and either of which when closed causes the loud speaker 24 to emit the oscillation note at the frequency selected by button 11 and at the attenuation selected by the attenuator knob 21. Switch 27 is located at the end of a flexible cord 29 connected to the apparatus by a jack-plug 30 and is adapted to be used by the operator. Switch 28 is similarly connected by a longer flexible cord 31 to the plug 30 and is adapted to be used by the subject.

The loud speaker 24, which is energized upon closing of either of the switches 27 or 28, is preferably positioned in a convenient place within housing 10 so that the sound thereof may be readily heard by both the subject and the operator. For example, it may be placed behind a grill 24' in the side wall of the housing 10, as shown, although it preferably is located in the rear wall thereof facing the subject, who is positioned so that he in turn faces the operator, who is positioned at the opposite side of the apparatus with the push-buttons 11 and the attenuator knob 21 before him. An on-off switch 32 in the current supply line 12 is located at a convenient position for the operator and a pilot light 33 may also be provided for indicating that the apparatus is in operating condition.

Suitably positioned in a convenient location for use by the operator, preferably on the top of the apparatus, is a removable card 34 divided by ordinate and abscissae lines into squares for plotting a curve, as indicated in Fig. 3. Each ordinate represents a frequency corresponding to the frequency indications of the several buttons 11, and each abscissa represents the corresponding decibel indication on the attenuator dial 22.

In carrying out the method of this invention, the operator faces the several dials of the apparatus and places the subject in a position facing the operator on the opposite side of the apparatus. The exact distance between the subject and the apparatus 10 is not critical, the average being around three feet, but it is important that these relative positions be maintained throughout the entire test. The operator then provides the subject with the switch button 28.

It will be observed that, because the test sounds issue from the loud speaker 24 located at that distance from the subject, these sounds have superimposed thereon all of the background noises in an ordinary room which are present under normal hearing conditions and these background noises should remain substantially the same throughout any test.

Beginning with the lowest frequency indicated on the scale 11' adjacent buttons 11, say 300 cycles, the operator depresses the corresponding button and moves the attenuating knob 21 to the lowest attenuator position, as indicated on the dial 22. The operator then causes the speaker 24 to emit a signal, such as a dot and a dash, by appropriately pressing his switch button 27, having previously instructed the subject to repeat the signal by pressing his button 28 in the same manner if he hears it. If the subject hears the sound emitted by the loud speaker the operator decreases the volume of sound at the same frequency by increasing the attenuation with knob 21, until the subject fails to repeat the signal correctly.

In this way the operator may establish the attenuation at which the subject's response becomes uncertain or inaccurate, and the highest attenuation at which an accurate response is obtained for that frequency is plotted on the card 34. For example, it may be ten decibels at 300 cycles as indicated in Fig. 3. This is repeated for each frequency indicated on the scale 11' adjacent the buttons 11, the operator pushing the buttons 11 successively and adjusting the attenuation for each frequency in the manner described, varying the dot-dash signal from time to time so that the subject will not hear the same signal for each frequency.

The points plotted on the card 34 by the operator are then connected and the corresponding curve 35 represents a relative measure of the subject's threshold of hearing and indicates to the experienced operator the probable hearing aid combination that the subject requires. The operator then fits the selected hearing aid on the subject and while the subject remains in the same position as before and under the same external conditions, the process is repeated and a second curve 36 plotted on the card 34 in the same way.

The spacing of this second curve 36 above the first curve 35 on the card 34 indicates the relative gain in hearing ability afforded by the selected hearing aid and also is a relative measure of the subject's threshold of hearing as improved by the hearing aid. By selecting a hearing aid providing greater or less volume at frequencies indicated by the curve 36 to be low or high, the subject can be accurately fitted.

It will be understood that curves 35 and 36 are purely relative and do not indicate a measure of definite hearing loss or gain and the curves for the same subject and the same hearing aid may differ in different localities or rooms, because of the varying noise level and the acoustic properties of different rooms in which the readings are taken, as well as a difference in distance between the subject and apparatus. Nevertheless, the test, wherever made, is conducted under normal conditions of hearing to which the subject is subjected under everyday conditions and is an accurate and satisfactory method of fitting him with the proper hearing device.

Although a preferred embodiment of the apparatus for practicing the method of this invention has been illustrated and described herein, it is to be understood that any other suitable apparatus may be used to practice the method defined by the appended claims.

I claim:

1. A sonic method of fitting a deafened person with hearing aid apparatus, which consists in emitting signals of predetermined character from a fixed source at a plurality of selected audible frequencies in a room having substantially unchanged background noises normal to the room superimposed on said emitted signals, determining the lowest decibel volume of said signal heard by the person in said room without aid of hearing apparatus for each of said frequencies by the accuracy of his repetition of each signal while said person remains at a fixed distance from the source of said signals, said signals being conducted by the unconfined air in said room to his ears from said source, providing the person with a hearing aid apparatus selected to improve his hearing at the frequencies at which his responses indicated deficient hearing, and repeating the emission of signals at the same frequencies to compare from his responses the improvement in his hearing over that without hearing apparatus, under unchanged background noise conditions and at the same distance from said signal source, whereby the person may be fitted with a hearing apparatus which raises the decibel level of this hearing to approximately that of a person with normal hearing.

2. A sonic method of fitting a deafened person with hearing aid apparatus, which comprises determining from his responses the acuity of his unaided hearing at a predetermined distance from a fixed source of sound by emitting signals of predetermined frequency and volume in a space containing background noises normal to the environment of the apparatus at the time of the fitting, fitting the person with a hearing aid apparatus for raising his hearing acuity from the determined level to normal level, and repeating the emission of said signals while said person remains at said predetermined distance from said source and under the same background noise conditions to determine from his responses the degree of improvement in his hearing acuity with the said hearing aid apparatus, whereby the person may be fitted with a hearing aid providing him with substantially normal hearing under normal background noise conditions.

EINAR A. STROMMEN.